(12) United States Patent
Filimonov et al.

(10) Patent No.: US 10,140,981 B1
(45) Date of Patent: Nov. 27, 2018

(54) DYNAMIC ARC WEIGHTS IN SPEECH RECOGNITION MODELS

(71) Applicant: Amazon Technologies, Inc., Reno, NV (US)

(72) Inventors: Denis Sergeyevich Filimonov, Seattle, WA (US); Ariya Rastrow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 14/301,245

(22) Filed: Jun. 10, 2014

(51) Int. Cl.
*G10L 15/183* (2013.01)
*G10L 15/16* (2006.01)

(52) U.S. Cl.
CPC ............ *G10L 15/183* (2013.01); *G10L 15/16* (2013.01)

(58) Field of Classification Search
CPC ....................................................... G10L 15/16
USPC .............................................................. 704/232
See application file for complete search history.

(56) References Cited

U.S. PATENT DOCUMENTS

| | | | | |
|---|---|---|---|---|
| 5,317,673 A * | 5/1994 | Cohen | ................... | G10L 15/144 704/232 |
| 5,581,659 A * | 12/1996 | Takatori | ................... | G06N 3/08 706/19 |
| 6,151,574 A * | 11/2000 | Lee | ................... | G10L 15/144 704/243 |
| 6,324,510 B1 * | 11/2001 | Waibel | ................... | G10L 15/02 704/232 |
| 6,574,597 B1 * | 6/2003 | Mohri | ................... | G10L 15/183 704/251 |
| 6,999,925 B2 * | 2/2006 | Fischer | ................... | G10L 15/07 704/236 |
| 7,590,536 B2 * | 9/2009 | Bates | ................... | G10L 15/197 704/231 |
| 8,600,746 B1 * | 12/2013 | Lei | ................... | G10L 15/22 704/235 |
| 9,047,870 B2 * | 6/2015 | Ballinger | ................... | G06F 17/289 |
| 9,076,445 B1 * | 7/2015 | Lloyd | ................... | G10L 15/183 |
| 9,153,231 B1 * | 10/2015 | Salvador | ................... | G10L 15/065 |
| 9,324,321 B2 * | 4/2016 | Xue | ................... | G10L 15/075 |
| 9,620,145 B2 * | 4/2017 | Bacchiani | ................... | G10L 25/30 |
| 2004/0083098 A1 * | 4/2004 | Mozer | ................... | G04G 21/06 704/231 |
| 2005/0021337 A1 * | 1/2005 | Kwon | ................... | G10L 15/144 704/256 |

(Continued)

*Primary Examiner* — Forrest F Tzeng
(74) *Attorney, Agent, or Firm* — Knobbe, Martens, Olson & Bear, LLP

(57) ABSTRACT

Features are disclosed for performing speech recognition on utterances using dynamic weights with speech recognition models. An automatic speech recognition system may use a general speech recognition model, such a large finite state transducer-based language model, to generate speech recognition results for various utterances. The general speech recognition model may include sub-models or other portions that are customized for particular tasks, such as speech recognition on utterances regarding particular topics. Individual weights within the general speech recognition model can be dynamically replaced based on the context in which an utterance is made or received, thereby providing a further degree of customization without requiring additional speech recognition models to generated, maintained, or loaded.

22 Claims, 6 Drawing Sheets

(56) References Cited

U.S. PATENT DOCUMENTS

| | | | |
|---|---|---|---|
| 2011/0082696 A1* | 4/2011 | Johnston | G06F 17/30026 704/243 |
| 2011/0218804 A1* | 9/2011 | Chun | G06F 17/289 704/243 |
| 2012/0303370 A1* | 11/2012 | Bangalore | G06K 9/00355 704/249 |
| 2014/0257803 A1* | 9/2014 | Yu | G06N 3/0481 704/232 |
| 2015/0039299 A1* | 2/2015 | Weinstein | G10L 15/16 704/202 |
| 2015/0127327 A1* | 5/2015 | Bacchiani | G10L 25/30 704/202 |
| 2015/0254334 A1* | 9/2015 | Mengibar | G10L 15/265 704/235 |
| 2015/0269938 A1* | 9/2015 | Lloyd | G10L 15/183 704/235 |
| 2017/0162203 A1* | 6/2017 | Huang | G10L 15/285 |

* cited by examiner

DYNAMIC ARC WEIGHTS IN SPEECH RECOGNITION MODELS

BACKGROUND

Natural language processing systems include various modules and components for receiving input from a user (e.g., audio, text, etc.) and determining what the user meant. In some implementations, a natural language processing system includes an automatic speech recognition ("ASR") module that receives audio input of a user utterance and generates one or more likely transcriptions of the utterance. Automatic speech recognition modules typically include an acoustic model and a language model. The acoustic model is used to generate hypotheses regarding which subword units (e.g. phonemes or triphones) correspond to an utterance based on the acoustic features of the utterance. The language model is used to determine the most likely transcription of the utterance based on the hypotheses generated using the acoustic model and lexical features of the language in which the utterance is spoken.

Automatic speech recognition systems may implement speech recognition models in different ways to obtain different benefits. For example, a language model may be implemented in as a finite state transducer ("FST"). An FST-based language model is a directed graph with nodes and directed arcs. The nodes correspond to decoding states, and the directed arcs correspond to weights for transitioning from one state to another (e.g., recognizing an additional subword unit, word, n-gram, etc.). Each path through the graph corresponds to an utterance. Some language models include a large number of different states (e.g., millions), and may have a similar number of arcs (or more).

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
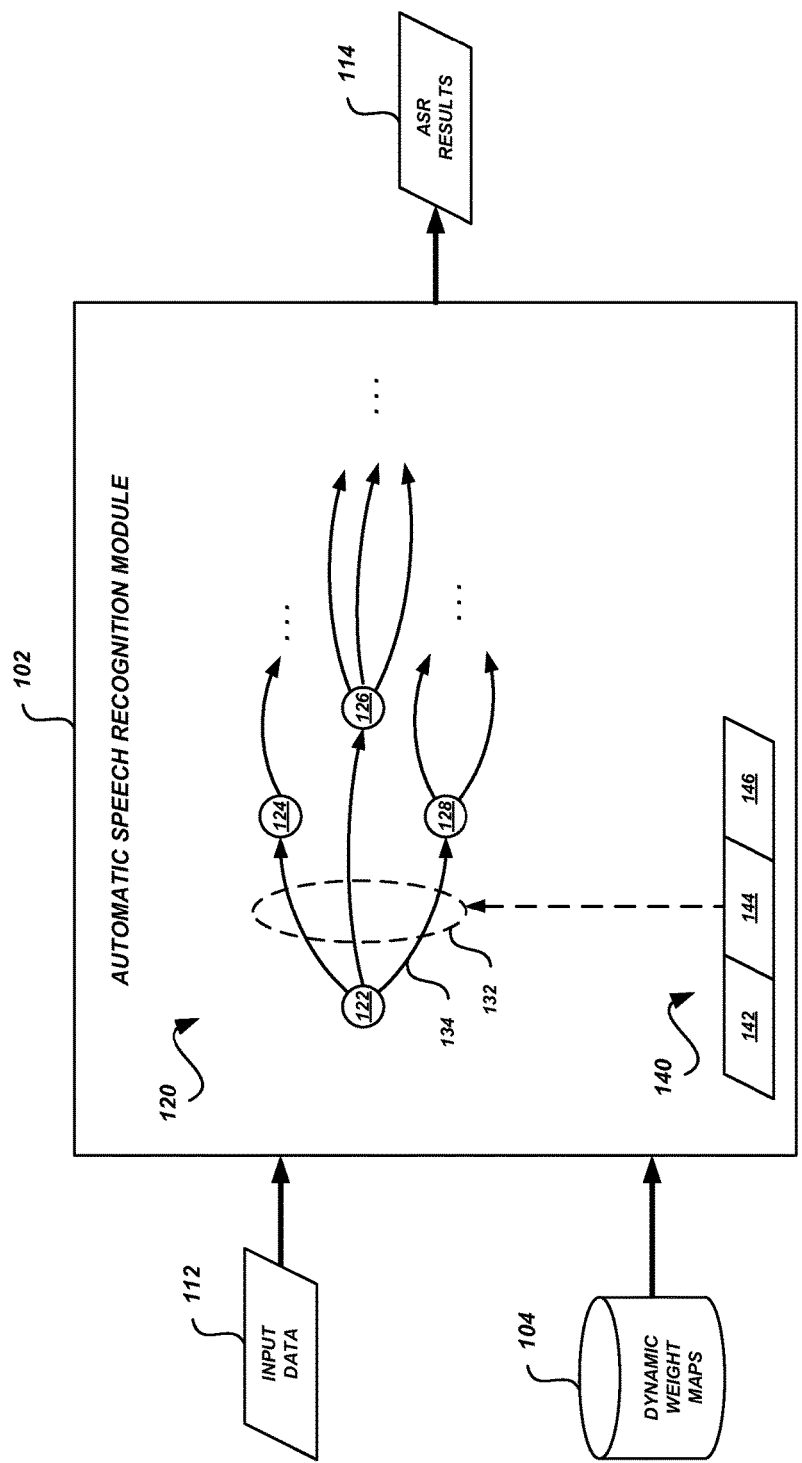
FIG. 1 is a block diagram of an illustrative automatic speech recognition module operative to dynamically change arc weights in a finite state transducer according to some embodiments.

The present disclosure relates to dynamically changing weights in general automatic speech recognition ("ASR") models based on the context in which a user utterance is made. In this way, general ASR models may be customized for the current context without the overhead of training, maintaining, and loading an entire ASR model designed specifically for the current context.

Conventionally, ASR systems use speech recognition models, including acoustic models and language models, to recognize or "decode" user utterances (e.g., to generate transcripts of user utterances). Words or subword units (e.g., phonemes) identified by scoring audio of a user utterance with an acoustic model can be subsequently processed using a language model to automatically generate one or more likely transcripts of the utterance. From the perspective of a user, the perceived performance of an ASR system may be defined in terms of its accuracy and performance latency. Different types of language models each have their own performance benefits and drawbacks. Large general language models may provide coverage for most or substantially all words that an ASR system will encounter. However, such general language models may not provide the most accurate results in all contexts, including situations when users are likely to use only a small number of words, when users are likely to use uncommon words that may be easily confusable with more common words, etc. In these situations, smaller language models tailored for specific contexts may provide more accurate results. However, if the context changes over the course of a multi-turn dialog or from user to user, the overhead that comes with loading and using the smaller models tailored for the specific contexts may cause poor user-perceived performance. In addition, using a smaller model tailored for the wrong context can cause poor recognition accuracy.

Some aspects of the present disclosure relate to automatically changing or replacing arc weights in large, general ASR models based on the context in which an utterance is made. A large, general ASR model, such as a language model implemented as finite state transducer ("FST"), can be shared across multiple ASR decoder runs corresponding to multiple user utterances. A map of FST states to replacement arc weights can be used to replace weights for certain arcs in the FST depending upon the current context. For example, in some contexts weights for a subset of arcs in the FST can be replaced to decode individual utterances associated with those contexts. Weights for a different subset of arcs in the FST can be replaced to decode individual utterances associated with different contexts, or weights for the same subset of arcs can be replaced with different weights. Accordingly, a large, general language model may become dynamic in the sense that it can be repeatedly customized for the current context. The dynamic nature of the general language model can help reduce or eliminate the overhead of training, maintaining, and loading an entire language model designed specifically for the context.

Additional aspects of the present disclosure relate to identifying the current context of the utterance, and obtaining the appropriate arc weights that will replace corresponding weights in the general FST. For example, various contextual factors may be taken into account, such as the specific user making the utterance, the date/time at which utterance was made, whether the utterance was made in response to a system-initiated dialog (and if so, the subject of the dialog), etc. Specific portions of the general FST may be better suited than other portions to handle utterances made in certain contexts. When the context of a current utterance is determined, the arc weights to the portions of the general FST best suited to decode utterances in the current context can be replaced with differently-weighted arcs that increase the likelihood that decoding paths will be extended into those portions. In addition, arc weights to portions of the general FST that are not well-suited to decode utterances in the current context can be replaced with differently-weighted arcs that reduce the likelihood that decoding paths will be extended into those portions.

Although aspects of the embodiments described in the disclosure will focus, for the purpose of illustration, on dynamic replacement of arc weights in FST-based language models, one skilled in the art will appreciate that the systems and processes disclosed herein may be applied to any number of processes or applications performing automatic speech recognition. In addition, the systems and processes disclosed herein may be applied to FSTs generally, and are not limited to only FSTs using in speech recognition. Various aspects of the disclosure will now be described with regard to certain examples and embodiments, which are intended to illustrate but not limit the disclosure.

Example FST and Dynamic Weight Maps

With reference to an illustrative embodiment, FIG. 1 shows an example ASR module 102 that can implement dynamic updating of arc weights in an FST based on the context of an utterance. The ASR module 102 can receive input data 112, such as audio data of user utterances, feature vectors extracted for frames of audio data, etc. The ASR module 102 can then generate ASR results 114 for the input data, such as a transcription or n-best list of transcriptions of the user utterance. In some embodiments, the ASR module 102 may be a stand-alone system for providing speech recognition functionality. In some embodiments, the ASR module 102 may be part of a spoken language processing system. An example spoken language processing system is described in greater detail below with respect to FIG. 2.

The ASR module 102 can use a large FST-based language model 120 to decode user utterances. The FST 120 includes several nodes, which correspond to states of the FST 120. Pairs of states are connected via directed arcs, and each arc is associated with a weight for the transition from the earlier state to the later state. Although the FST 120 is shown in FIG. 1 as having 4 states and 9 arcs, the FST 120 is illustrative only. In practice, FSTs used as general language models may have a large number of states (e.g., millions of different states) and a similar number of arcs (or more). In some embodiments, the FST 120 may correspond to a collection of smaller FST-based language models, each tailored to a particular context or type of utterance. However, the collection of smaller FSTs may be interconnected and/or connected to a general FST by weighted arcs. As a result, the collection of connected FSTs may function as a single large FST, and may be used as such.

The ASR module 102 may keep the large FST 120 loaded for use in decoding any incoming utterances (or some subset thereof) due to the size of the FST 120. If the ASR module 102 had to load the FST 120 (or one of multiple available FSTs) each time an utterance was to be decoded, user-perceived performance may be impacted. By keeping the FST 120 loaded, the decoding process may begin more quickly in response to a user utterance.

The ASR module 102 may include or have access to a dynamic weight map data store 104 that includes one or more dynamic weight maps 140. A dynamic weight map, also referred to herein simply as a map, may include data that associates, or "maps," one or more states of the FST 120 to one or more replacement arc weights. The mapping may be conditional depending upon the current context associated with the utterance to be decoded. For example, one map 140 may include arc weights 144 that replace weights for existing arcs 132 originating from a particular state 122 in the FST 120. The map 140 may include state data 142 that indicates which state in the FST 120 (state 122 in this example) is to have its arc weights 132 replaced with arc weights 144 in the map 140. The map 140 may also include a context rule 146 that indicates the particular contextual circumstances under which the map 140 is to be used (e.g., the circumstances under which the arc weights 144 are to replace the weights for the arcs 132 for an FST state 122 indicated by the state data 142).

In one specific, non-limiting example, a map 140 may include a context rule 146 that indicates the map 140 is to be used for utterances received in response to a specific system prompt. Illustratively, the system prompt may be "What album would you like to hear?" after a user has asked to hear music. In this example, there may be a substantially increased probability that the next user utterance will include an album name. Without modification, the general FST 120 may be able to recognize various album names. In some embodiments, the FST 120 may even include a portion, such as a specific sub-model, that is specifically designed for use in recognizing album names. However, the FST 120 may nonetheless fail to recognize, to a satisfactory degree of accuracy, album names that are confusable with other more commonly used words and phrases unless the sub-model designed for recognizing album names is weighted accordingly. If the ASR module 102 receives contextual data indicating the previous system prompt was "What album would you like to hear?," the ASR module 102 may determine that the current context satisfies the context rule 146 for the map 140. The ASR module 102 can then load the map 140 and reference the replacement arc weights 144 when the state 122 corresponding to the state data 142 for the map 140 is reached. When decoding reaches the state 122 in the FST 120 indicated in the amp, the arc weights 144 from the map 140 can be used instead of the weights for the general FST arcs 132 to extend decoding to subsequent states 124, 126 and 128. One of the arcs in the map 140 may have a substantially greater weight than the FST arc 134 that it replaces. In this example, the arc may extend decoding into the area of the FST beginning with state 128. That area of the FST may be tailored or otherwise more desirable for decoding album names.

The map 140 and its use described in the example above are illustrative only, and are not intended to be limiting. In some embodiments, a map 140 may include multiple sets of replacement arc weights for multiple states in the FST 120, rather than a single set of replacement arc weights for a single state in the FST 120.

In some embodiments, the contextual rule may relate to other types of contextual data, such as the identity of the current user, the user's interests and previous utterances, the date, the time of day, etc. For example, one user may typically listen to different genres of music than another user. Accordingly, a different map may be generated for each user, or for each general class of user to which the specific users can be assigned.

In some embodiments, arcs in a map may be temporarily inserted into the FST to replace the more general FST arcs when the context rule associated with the map is satisfied. In this way, inspecting the map at each state of the FST order to determine whether there are replacement arcs in the map can be avoided. For example, if the FST is represented in memory as a data structure with pointers to memory locations for particular nodes and/or arcs, the pointers may be replaced with pointers the corresponding portions of the map.

Spoken Language Processing System Environment

Figure 2:
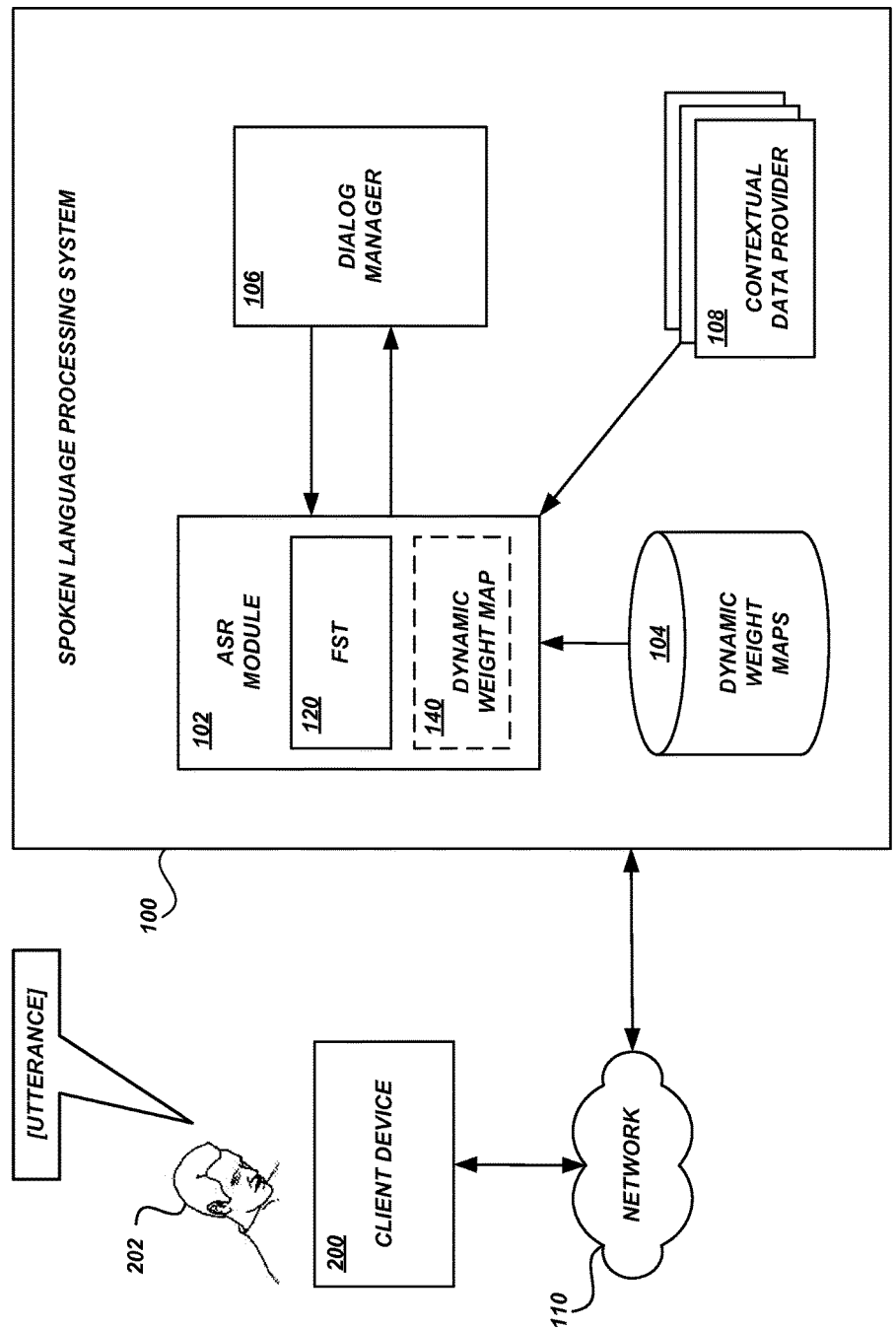
FIG. 2 is a block diagram of an illustrative computing environment in which the features of the present disclosure may be implemented, including a client device and a remote spoken language processing system.

FIG. 2 illustrates an example spoken language processing system 100 and a client device 200. The spoken language processing system 100 can be a network-accessible system in communication with the client device 200 via a communication network 110, such as a cellular telephone network or the Internet. A user 202 may use the client device 200 to submit utterances, receive information, and initiate various processes, either on the client device 200 or at the spoken language processing system 100. For example, the user can issue spoken commands to the client device 200 in order to get directions, listen to music, query a data source, dictate a document or message, or the like.

The client device 200 can correspond to a wide variety of electronic devices. In some embodiments, the client device 200 may be a computing device that includes one or more processors and a memory which may contain software applications executed by the processors. The client device 200 may include a microphone or other audio input component for accepting speech input on which to perform speech recognition. The software of the client device 200 may include components for establishing communications over wireless communication networks or directly with other computing devices. Illustratively, the client device 200 may be a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

The spoken language processing system 100 can be any computing system that is configured to communicate via a communication network. For example, the spoken language processing system 100 may include any number of server computing devices, desktop computing devices, mainframe computers, and the like. In some embodiments, the spoken language processing system 100 can include several devices physically or logically grouped together, such as an application server computing device configured to perform speech recognition on an utterance and a database server computing device configured to store records and speech recognition models.

The spoken language processing system 100 can include an ASR module 102, a weights data store 104, a dialog manager 106, and one or more contextual data providers 108. Illustratively, contextual data providers 108 may include sources of the current date and time, user identification components, user interaction analysis components, and the like. For example, different dynamic weight maps may be used depending upon the current date or time, the particular user who has made an utterance, the user's previous interactions with the system, etc.

In some embodiments, the spoken language processing system 100 can include various modules and components combined on a single device, multiple instances of a single module or component, etc. For example, the spoken language processing system 100 may include a separate database server that may be configured with a data store for context-specific weights, user data, etc., and a server or group of servers configured with ASR modules 102, dialog managers 104 and contextual data providers 108. In multi-device implementations, the various devices of the spoken language processing system 100 may communicate via an internal communication network, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network 110. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 110 may be a publicly accessible network of linked networks, possibly operated by various distinct parties, such as the Internet. In other embodiments, the network 110 may include a private network, personal area network ("PAN"), LAN, WAN, cable network, satellite network, etc. or some combination thereof, each with access to and/or from the Internet. For example, the devices of the spoken language processing system 100 may be located within a single data center, and may communicate via a private network as described above. The client device 200 may communicate with spoken language processing system 100 via the Internet. The client device 200 may have access to the Internet via a wired or WiFi connection, or via a cellular telephone network (e.g., a Long Term Evolution or LTE network).

In some embodiments, the ASR module 102, either alone or in combination with other spoken language processing system modules and components, may be physically located on a client device 200. For example, a client device 200 may include an integrated ASR module 102 or spoken language processing system 100 such that no network access is required in order to use some or all of its features. As another example, a portion of ASR processing or other spoken language processing system 100 functionality may implemented on a client device 200, and other spoken language processing system components and features may be accessible via a communication network.

Utterance Processing with Dynamic Weight Maps

Figure 3:
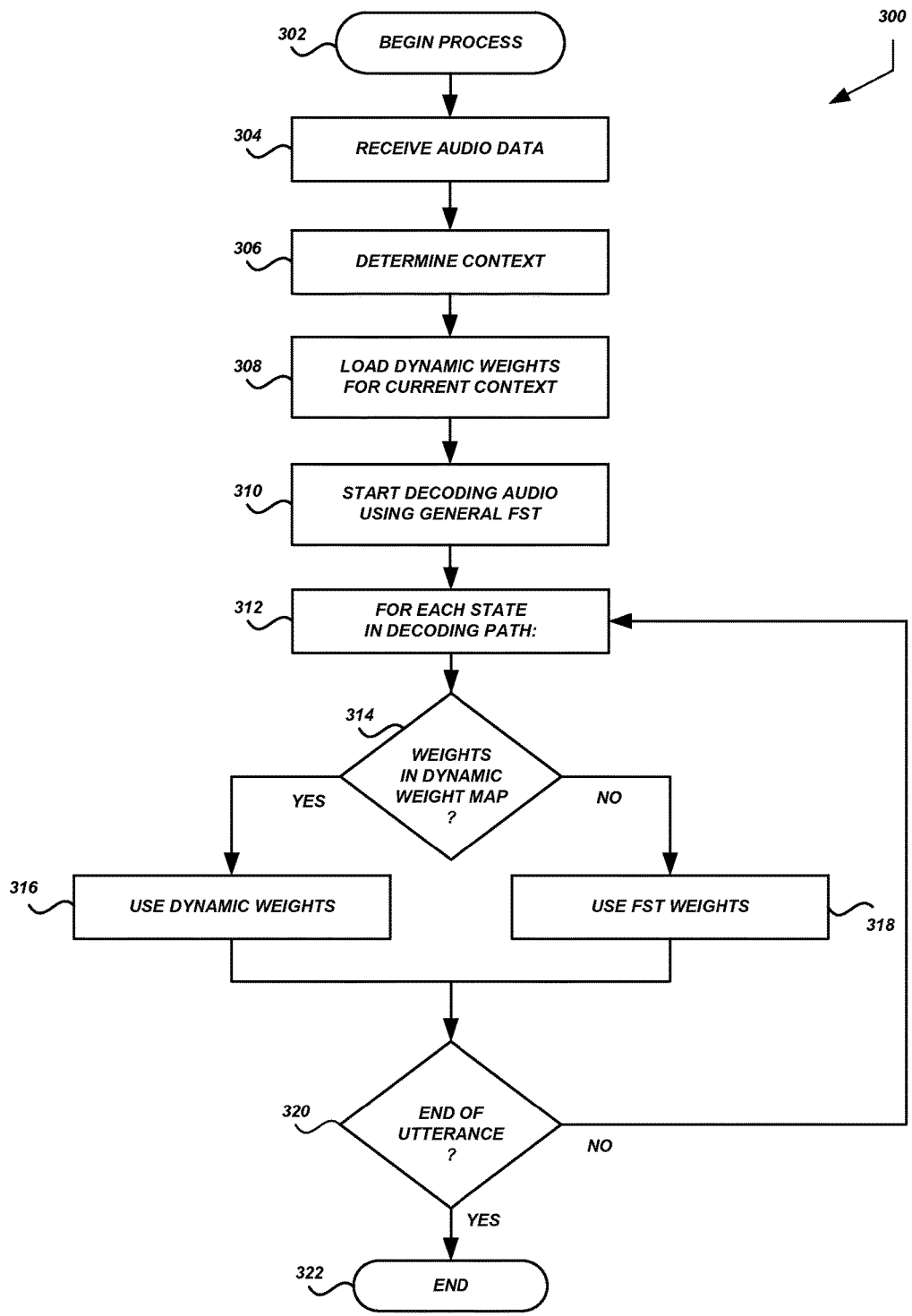
FIG. 3 is a flow diagram of an illustrative process for using dynamic arc weights with according to some embodiments.

With reference now to FIG. 3, a sample process 300 for performing ASR using a general language model 120 and dynamic weight maps 140 will be described. Advantageously, an ASR module 102 (or some other module or component of a spoken language processing system 100) performing the process 300 can obtain data regarding the current context, such as data from contextual data providers 108, and can then select an appropriate dynamic weight map 140 for the current context.

The process 300 begins at block 302. The process 300 may be embodied in a set of executable program instructions stored on a computer-readable medium, such as one or more disk drives, of a computing system of the spoken language processing system 100. When the process 300 is initiated, the executable program instructions can be loaded into memory, such as RAM, and executed by one or more processors of the computing system.

At block 304, the ASR module 102 or some other module or component of the spoken language processing system 100 can receive input data. For example, the input data may include audio data of a user utterance, or data derived from the audio data (e.g., feature vectors for frames of audio data).

At block 306, the ASR module 102 or some other module or component of the spoken language processing system 100 can determine the current context of the utterance. The context may include the date and/or time the utterance was made, the identity of the user that made the utterance, a previous utterance made by the user, a previous system prompt or response provided to the user, etc.

At block 308, the ASR module 102 or some other module or component of the spoken language processing system 100 can load dynamic weights for the current context. The dynamic weights may be stored as dynamic weight maps 140 in the dynamic weight map data store 104, or they may be obtained from some other source. Illustratively, the ASR module 102 can determine which dynamic weight map(s) to use based on a context rule associated with each weight map, based on a decision tree that indicates which weight map to use for particular contexts, based on the result of some computation or function, etc. FIGS. 4, 5A, 5B, 6A, and 6B show example utterances made in various contexts, and the selection of different dynamic weights used to process those utterances based on the context in which they are made.

Figure 4:
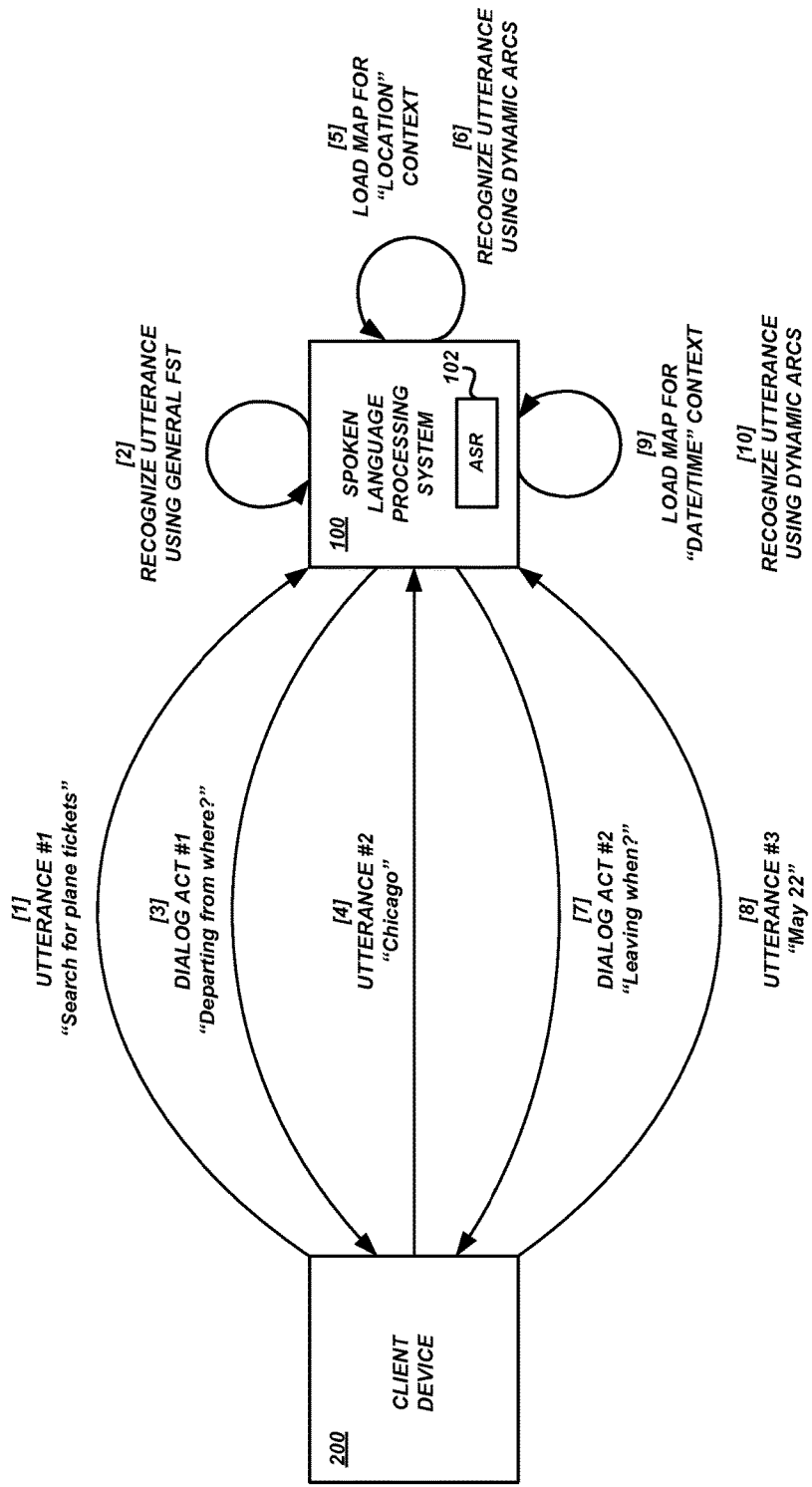
FIG. 4 is a diagram of illustrative interactions between a user and spoken language processing system operative to dynamically change arc weights based on context.

FIG. 4 illustrates the loading and using of dynamic weights based on which system prompt was last provided to a user before the current utterance. A user of a client device 200 may make an utterance at [1], such as "Search for plane tickets." The ASR module 102 of the spoken language processing system 100 can recognize the utterance at [2] using a general language model, such as the large FST 120 shown in FIGS. 1 and 2. The dialog manager 106 or some other module or component of the spoken language processing system 100 may prompt the user at [3] to provide a departure destination. The user may respond at [4] with the utterance "Chicago."

The ASR module 102 or some other module or component of the system 100 can determine the context for the current utterance. The context may include the user's identity, the current date/time, and/or other relevant information. In this example, the most relevant context is the dialog prompt to which the user is responding: a prompt for a departure location. A particular dynamic weight map 140 or other set of weights may be associated with this context. For example, a decision tree may indicate that when the previous dialog prompt relates to a location, a particular dynamic weight map 140 is to be used. As another example, a particular dynamic weight map 140 may be associated with a context rule 146 indicating the applicability of the weight map 140 to utterances received in response to location prompts. These examples of context determination and dynamic weight map selection are illustrative only, and are not intended to be limiting. In some embodiments, other methods may be used, a combination of factors may be considered, etc.

As shown, the ASR module 102 can load the map for the "location" context at [5]. The map of the "location" context may include arcs weighted such that paths are more likely to be extended to areas of the FST that are optimized or otherwise tailored to recognize location names. For example, a particular state in the FST may include arcs to multiple (e.g., two or more) different areas of the FST, and each area may be optimized to recognize different groups of words. One of the portions may be optimized to recognize location names, another may be optimized to recognize dates and times, another may be optimized to recognize genres of music, etc. The weights on the arcs to each of these different portions of the FST may each be set to some value reflecting the overall probability that users will make utterances that include words corresponding to those portions of the FST. However, in the current context, there is a substantially increased probability that the user will make an utterance including a location. Accordingly, the dynamic arc weights which replace or are otherwise used instead of the default or general FST arc weights can reflect this increased probability by using a higher weight on the arc to the location portion of the FST and lower weights on the arcs to the other portions of the FST. The ASR module 120 may then recognize the utterance using the FST and dynamic weights at [6].

The dialog manager 106 or some other module or component of the spoken language processing system 100 may prompt the user at [7] to provide a departure date. The user may respond with a particular date at [8]. The ASR module 102 may then perform another context determination for the current user utterance ("May 22"). For this utterance, the context has changed, and the previous system prompt was for a date rather than a location. The ASR module 102 or some other module or component may determine that a different dynamic weight map 140 corresponds to the "date/time prompt" context in a manner similar to the determination described above for the "location" context. The ASR module 102 may then load the appropriate dynamic weight map at [9], and perform speech recognition on the utterance using the FST and dynamic weights at [10]. In this context, the dynamic weights may reflect the substantially increased probability that the utterance includes a date or time, and may therefore increase the weight on the arc that leads to that portion of the FST and decrease the weights on arcs leading to other portions.

Figure 5A:
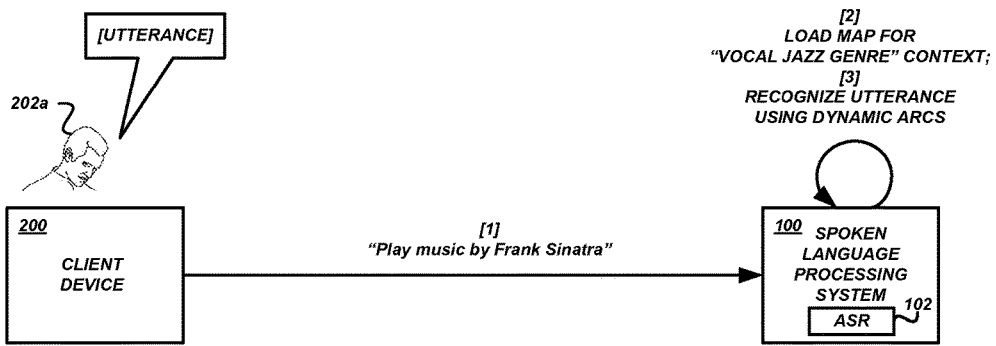
FIGS. 5A and 5B are diagrams of illustrative interactions between a user and spoken language processing system operative to dynamically change arc weights based on context.
Figure 5B:
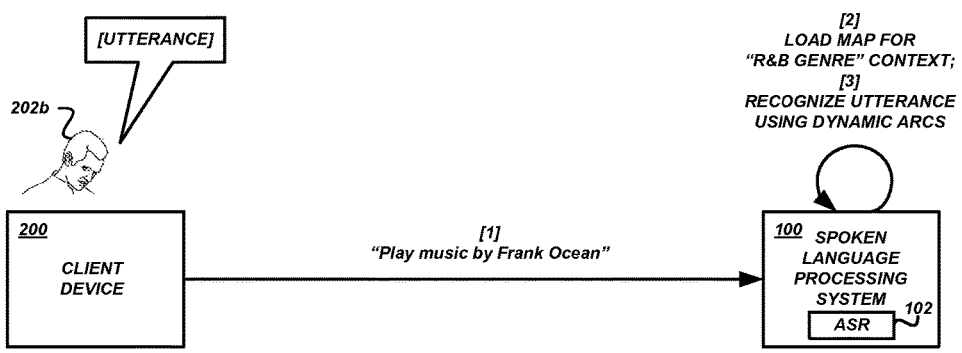

FIGS. 5A and 5B illustrate another example of context-based selection of dynamic weights for use with a general FST. In the example illustrated in FIG. 5A, the spoken language processing system 100 may be used to recognize user utterances related to music, such as utterances to control a music player, to purchase music, etc. At [1], a first user 202a makes an utterance to "Play music by Frank Sinatra." The spoken language processing system 100 can determine that this particular user 202a is more likely to request music in the "vocal jazz" genre than in any other genre. The determination may be based on previous system interactions involving this particular user 202a, on information regarding the music purchased by this user 202a, on demographic information associated with this user 202a, etc. For example, logging information may be maintained regarding user utterances and other system interactions, and that information may be analyzed to assign or determine attributes for individual users.

In response to determining the relevant context for this utterance, the ASR module 102 can load dynamic weights for the "vocal jazz music genre" context at [2]. The FST may include a portion tailored to recognize music-related terms, such as artist names, song titles, and the like. A particular state of the FST may have arcs leading to sub-portions of the FST that are optimized for particular musical genres. The dynamic weights loaded at [2] can replace the weights associated with those arcs to reflect the increased probability that this user 202a will make an utterance that includes vocal jazz artist names, song titles, etc. The ASR module 120 can then recognize the utterance at [3] using the FST and dynamic weights.

In the example illustrated in FIG. 5B, a different user 202b makes an utterance at [1] that is similar to the utterance made by the user 202a in FIG. 5A. However, this particular user 202b may typically listen to or make utterances regarding music in a different musical genre, such as "R&B." The spoken language processing system 100 can take this attribute into account when determining which dynamic weights to use, and can therefore load dynamic weights for the "R&B music genre" context at [2], rather than the "vocal jazz music genre" described above. In some embodiments, the same spoken language processing system 100 may be performing the operations in both FIGS. 5A and 5B, and the same general FST may be used by the ASR module 120 in each example. Due to the different contexts (e.g. user music preferences), different dynamic weights may be used to customize the FST for each context.

Figure 6A:
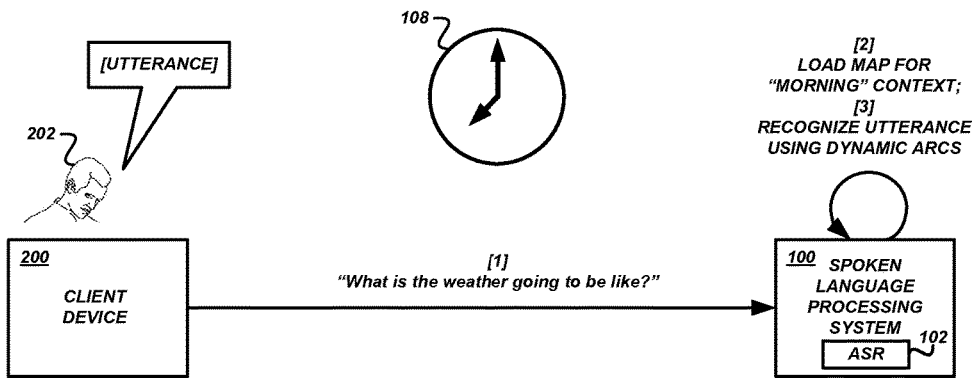
FIGS. 6A and 6B are diagrams of illustrative interactions between a user and spoken language processing system operative to dynamically change arc weights based on context.
Figure 6B:
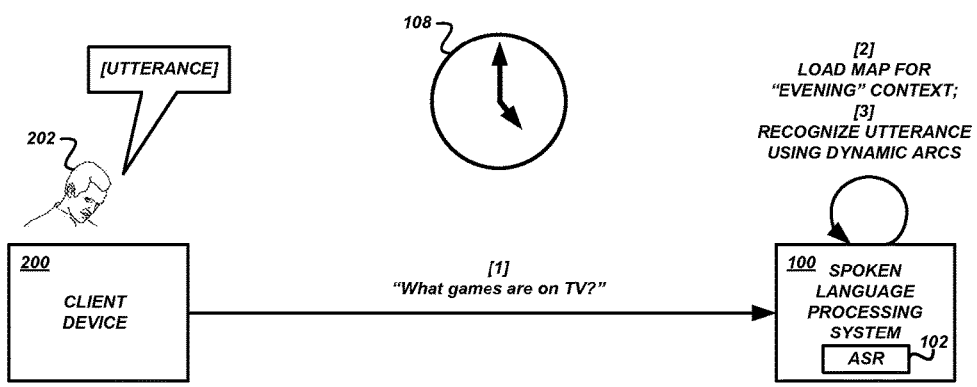

FIGS. 6A and 6B illustrate another example of context-based selection of dynamic weights for use with a general FST. In the illustrated examples, the context on which selection of dynamic weights is based includes temporal information (e.g., time of day, date, etc.). Illustratively, users may be more likely to make utterances regarding certain topics at certain times of the day than at other times of the day.

As shown in FIG. 6A, a user 202 may make an utterance at [1], such as a query for the weather. There may be a substantially increased probability that users will ask about the weather in the morning than in the early evening. The spoken language processing system 100 can use data from a contextual data provider 108, such as date/time service, to determine the context for the current utterance. Dynamic weights may be selected based on the context at [2]. For example, the dynamic weights may increase the probability associated with an area of the FST tailored for utterances made in the morning. The ASR module 102 can use the FST with the dynamic weights to recognize the utterance at [3].

In the example illustrated in FIG. 6B, a user 202 (the same user or a different user) may make an utterance at a different time of day, such as uttering "What games are on TV?" in the early evening. The spoken language processing system 100 can use data from the contextual data provider 108 (e.g., a date/time service) to select a set of dynamic weights at [2] that is different than the set of dynamic weights selected in the example in the FIG. 6A. For example, the dynamic weights selected in the example shown in FIG. 6B may increase the weight of an arc that leads to an area of the FST tailored for utterances made in the evening, and may reduce the weight of the arc that leads to the area of the FST tailored for utterances made in the morning.

Returning to the process 300 shown in FIG. 3, the ASR module 102 can use the FST 120 with the set of dynamic weights to recognize a user utterance at block 310, such as one of the user utterances shown in FIG. 4, 5A, 5B, 6A or 6B. In some embodiments, the context may be determined and dynamic weights may be loaded at blocks 306 and 308 in parallel with decoding of the audio at block 310. For example, decoding may begin using the general FST while a separate processor, group of processors, server, or group of servers determines the context and loads the appropriate dynamic weights, if any. Once the dynamic weights have been loaded, any remaining decoding can be performed using the dynamic weights.

At decision block 314, for each FST state in a current decoding path, the ASR module 102 can determine whether there are corresponding weights in the dynamic weight map. If so, the ASR module 102 can use the dynamic weights at block 316 to extend the decoding path. Otherwise, the ASR module 102 can use the existing FST weights to extend the decoding path.

At decision block 320, the ASR module 102 can determine whether the end of the utterance has been reached. If so, the process 300 can terminate at block 322. Otherwise, if there is additional input data, the process 300 can return to block 312.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as physical electronic hardware, or as a combination of computer software and physical electronic hardware. To clearly illustrate this interchangeability, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
 a computer-readable memory storing executable instructions; and
 one or more processors in communication with the computer-readable memory, wherein the one or more processors are programmed by the executable instructions to at least:
  obtain audio data, generated by a microphone, regarding an utterance of a user;
  obtain context information regarding a context associated with the utterance;
  obtain a language model comprising a finite state transducer, wherein the finite state transducer comprises a plurality of states and a plurality of weights, and wherein the plurality of weights comprises:
   a first default weight corresponding to a transition from a first state of the plurality of states to a second state of the plurality of states; and
   a second default weight corresponding to a transition from the first state to a third state of the plurality of states;
  select a replacement weight, from a plurality of predetermined replacement weights that correspond to the transition from the first state to the second state,
   wherein the replacement weight is selected from the plurality of predetermined replacement weights based at least partly on the context information,
   wherein the context information indicates the utterance is associated with a first context,
   wherein the transition from the first state to the second state is a transition to a portion of the finite state transducer comprising a first subset of states trained for recognition of a first plurality of words associated with the first context,
   wherein the transition from the first state to the third state is a transition to a portion of the finite state transducer comprising a second subset of states trained for recognition of a second plurality of words associated with a second context different than the first context, and
   wherein use of the replacement weight increases a likelihood of the transition from the first state to the second state in comparison with a transition from the first state to the third state;
  replace the first default weight in the language model with the replacement weight, wherein a third default weight corresponding to a transition from the second state to a fourth state remains part of the language model during use of the language model with the replacement weight;
  generate speech recognition results using the audio data, the language model, and the replacement weight, wherein a quantity of states of the finite state transducer is the same during use of the replacement weight as when using the first default weight; and
  present, via a user interface, a response to the utterance, wherein the response is based at least partly on the speech recognition results.

2. The system of claim 1, wherein the first context corresponds to at least one of: a user identity; temporal information; a previous user utterance; a previous prompt presented to the user; or a topic.

3. The system of claim 1 wherein the one or processors are further configured to:
 select a plurality of replacement weights of the plurality of predetermined replacement weights based at least partly on the context information; and
 generate speech recognition results using the plurality of replacement weights instead of a plurality of corresponding default weights of the finite state transducer.

4. A computer-implemented method comprising:
 as executed by a spoken language processing system comprising one or more computing devices configured to execute specific instructions,
  obtaining audio data, generated by a microphone, corresponding to an utterance;
  selecting a replacement weight, from a plurality of predetermined replacement weights that correspond to a transition from a first state in a language model to a second state in the language model,
   wherein the replacement weight is selected from the plurality of predetermined replacement weights based at least partly on context information that indicates the utterance is associated with a first context,
   wherein the language model comprises a first default weight corresponding to the transition from the first state to the second state,
   wherein use of the replacement weight increases a likelihood of the transition from the first state to the second state in comparison with a transition from the first state to a third state of the language model,
   wherein the transition from the first state to the second state is a transition to a portion of the language model comprising a first subset of states trained for recognition of a first plurality of words associated with the first context, and
   wherein the transition from the first state to the third state is a transition to a portion of the language model comprising a second subset of states trained for recognition of a second plurality of words associated with a second context that is different than the first context;
  replacing the first default weight with the replacement weight, wherein a second default weight corresponding to a transition between the second state and a fourth state remains in the language model during use of the language model with the replacement weight;
  generating speech recognition results using the audio data, the language model, and the replacement weight, wherein a quantity of states of the language model is the same during use of the replacement weight as when using the first default weight; and
  causing presentation of a response to the utterance via a user interface, wherein the response is based at least partly on the speech recognition results.

5. The computer-implemented method of claim 4, wherein the language model comprises a finite state transducer comprising a plurality of states and a plurality of weights, and wherein the plurality of weights comprises the first default weight.

6. The computer-implemented method of claim 4, wherein the language model comprises a plurality of sub-models, and wherein individual sub-models of the plurality of sub-models are optimized to recognize words associated with a different topic.

7. The computer-implemented method of claim 4, wherein the first context corresponds to at least one of: a user identity; temporal information; a previous user utterance; a previous prompt presented to a user; or a topic.

8. The computer-implemented method of claim 4, further comprising selecting a plurality of replacement weights of the plurality of predetermined replacement weights based at least partly on the context information, wherein each of the plurality of replacement weights corresponds to a different transition from the first state of the language model.

9. The computer-implemented method of claim 4, further comprising selecting a plurality of replacement weights of the plurality of predetermined replacement weights based at least partly on the context information, wherein a first subset of the plurality of replacement weights corresponds to one or more transitions from the first state of the language model, and wherein a second subset of the plurality of replacement weights corresponds to one or more transitions from a different state of the language model.

10. The computer-implemented method of claim 9, further comprising generating speech recognition results using the plurality of replacement weights instead of a plurality of corresponding default weights of the language model.

11. The computer-implemented method of claim 4, further comprising maintaining the language model in a non-transitory computer-readable memory of the one or more computing devices for a period of time, and wherein the language model is used to generate speech recognition results for utterances received from a plurality of different users during the period of time.

12. One or more non-transitory computer readable media comprising executable code that, when executed, cause one or more computing devices to perform a process comprising:
 obtaining audio data, generated by a microphone, corresponding to an utterance;
 selecting a replacement weight, from a plurality of predetermined replacement weights that correspond to a transition from a first state in a language model to a second state in the language model,
  wherein the replacement weight is selected based at least partly on context information indicating that the utterance is associated with a first context,
  wherein the language model comprises a first default weight corresponding to the transition from the first state to the second state, and a second default weight corresponding to a transition from the first state to a third state,
  wherein use of the replacement weight increases a likelihood of the transition from the first state to the second state in comparison with a transition from the first state to the third state of the language model,
  wherein the transition from the first state to the second state is a transition to a portion of the language model comprising a first subset of states trained for recognition of a first plurality of words associated with the first context, and
  wherein the transition from the first state to the third state is a transition to a portion of the language model comprising a second subset of states trained for recognition of a second plurality of words associated with a second context that is different than the first context;
 replacing the first default weight with the replacement weight, wherein a second default weight corresponding to a transition between the second state and a fourth state remains in the language model during use of the language model with the replacement weight;

generating speech recognition results using the audio data, the language model, and the replacement weight, wherein a quantity of states of the language model is the same during use of the replacement weight as when using the first default weight; and causing presentation of a response to the utterance via a user interface, wherein the response is based at least partly on the speech recognition results.

13. The one or more non-transitory computer readable media of claim 12, wherein the language model comprises a finite state transducer comprising a plurality of states and a plurality of weights, and wherein the plurality of weights comprises the first default weight.

14. The one or more non-transitory computer readable media of claim 12, wherein the language model comprises a plurality of sub-models, and wherein individual sub-models of the plurality of sub-models are optimized to recognize words associated with a different topic.

15. The computer-implemented method of claim 4, wherein a dynamic weight map associates individual replacement weights of the plurality of predetermined replacement weights with individual transitions of a plurality of transitions of the language model, and wherein selecting the replacement weight comprises evaluating a context rule of the dynamic weight map using the context information.

16. The one or more non-transitory computer readable media of claim 12, wherein a dynamic weight map associates individual replacement weights of the plurality of predetermined replacement weights with individual transitions of a plurality of transitions of the language model, and wherein selecting the replacement weight comprises evaluating a decision tree of the dynamic weight map using the context information.

17. The computer-implemented method of claim 4, further comprising generating the context information based at least partly on (1) a time at which the utterance is made and (2) a topic of a prior utterance made during a time period comprising the time, wherein the context information indicates the utterance is associated with the topic.

18. The computer-implemented method of claim 4, further comprising generating the context information based at least partly on a topic of a prompt presented prior to a time at which the utterance is made, wherein the context information indicates the utterance is associated with the topic.

19. The system of claim 1, wherein the language model with the first default weight is configured to recognize a same set of words as the language model with the replacement weight being used in place of the first default weight.

20. The system of claim 1, wherein the finite state transducer is a composite finite state transducer comprising a plurality of context-specific finite state transducers, wherein individual context-specific finite state transducers of the plurality of context-specific finite state transducers are associated with different contexts.

21. The computer-implemented method of claim 4, wherein replacing the first default weight with the replacement weight increases a likelihood of a recognized word being part of a first subset of a plurality of confusable words in comparison with a second subset of the plurality of confusable words, wherein the first subset of the plurality of confusable words is associated with the first context, and wherein the second subset of the plurality of confusable words is associated with the second context.

22. The computer-implemented method of claim 4 further comprising:
accessing a weight map comprising previously determined replacement weights for a subset of default weights of the language model;
performing speech recognition using the audio data and the language model, wherein performing speech recognition comprises analyzing at least a portion of the audio data with respect to a decoding path the of the language model;
determining, for a first transition of the decoding path, that there is no replacement weight in the weight map;
using a default weight for the first transition; and
determining, for a second transition of the decoding path, that there is a corresponding replacement weight in the weight map, wherein the first default weight is associated with the second transition, wherein the replacement comprises the corresponding replacement weight.

* * * * *

UNITED STATES PATENT AND TRADEMARK OFFICE
CERTIFICATE OF CORRECTION

PATENT NO. : 10,140,981 B1
APPLICATION NO. : 14/301245
DATED : November 27, 2018
INVENTOR(S) : Filimonov et al.

It is certified that error appears in the above-identified patent and that said Letters Patent is hereby corrected as shown below:

In the Claims

Column 13, Line 5, in Claim 3, after "or" insert --more--.

Column 16, Line 33, in Claim 22, change "the of" to --of--.

Signed and Sealed this
Fourteenth Day of April, 2020

Andrei Iancu
*Director of the United States Patent and Trademark Office*